March 15, 1955 C. W. VOGT 2,704,049
MOVABLE ADHESIVE REDISTRIBUTING
AND TAPE CUTTING MECHANISM
Filed Dec. 6, 1952 2 Sheets-Sheet 1
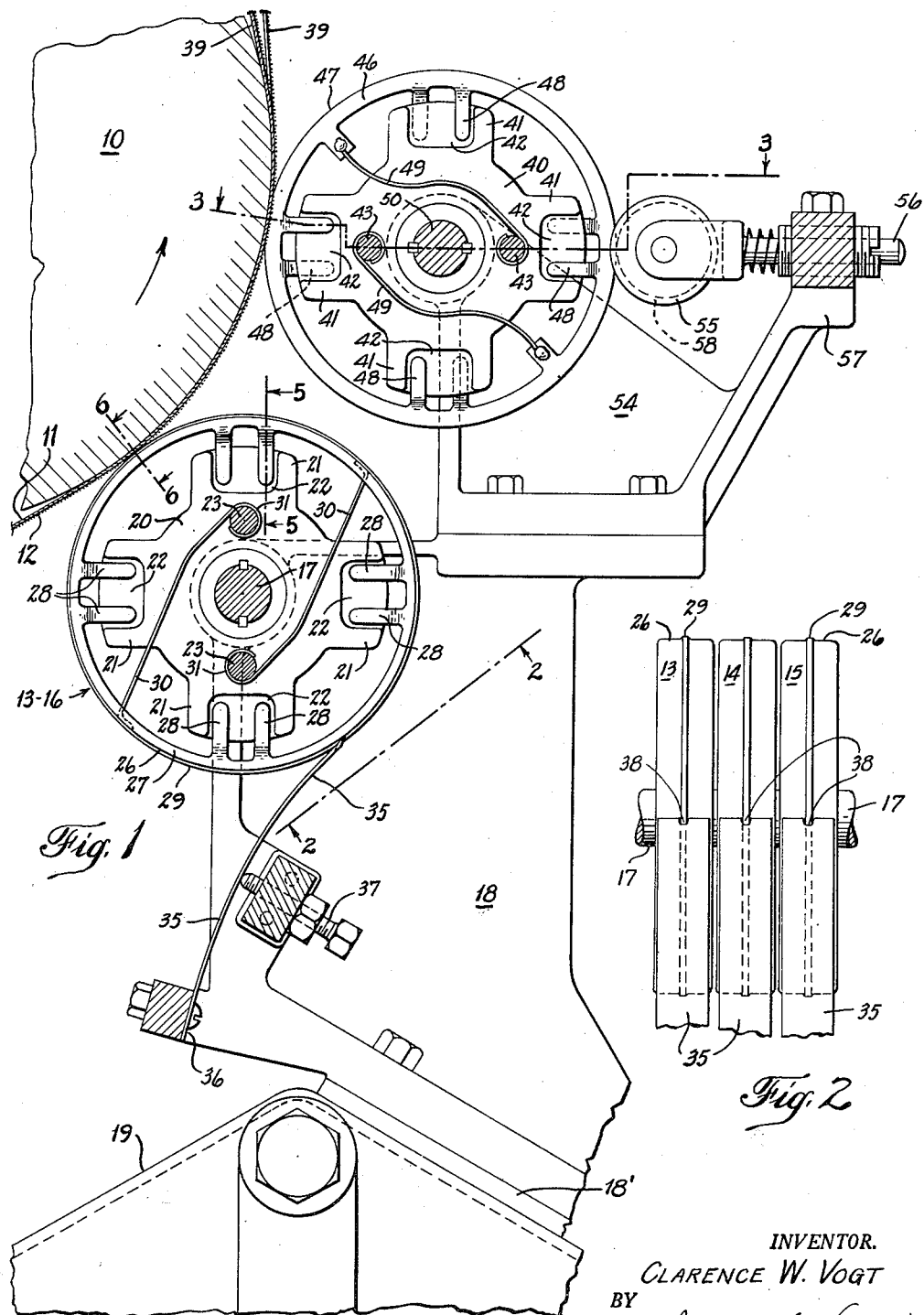
INVENTOR.
CLARENCE W. VOGT
BY
*his* ATTORNEYS.

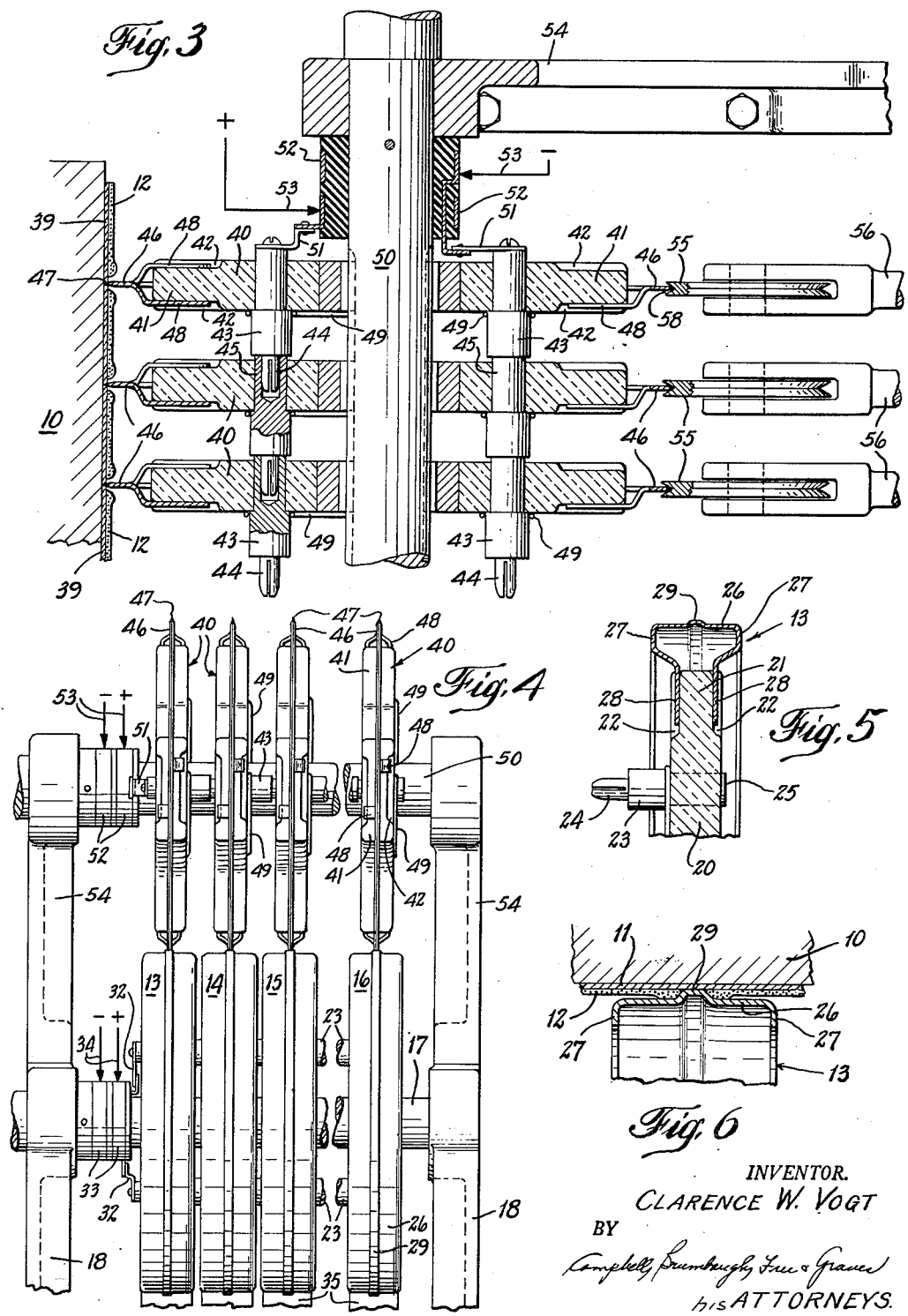

United States Patent Office 2,704,049
Patented Mar. 15, 1955

2,704,049

MOVABLE ADHESIVE REDISTRIBUTING AND TAPE CUTTING MECHANISM

Clarence W. Vogt, Norwalk, Conn.

Application December 6, 1952, Serial No. 324,463

11 Claims. (Cl. 118—101)

The present invention relates to mechanisms for controllably redistributing a layer of adhesive material upon a band of suitable base material and for cutting the band to form a multiplicity of strips of adhesive tape and embodies, more specifically, mechanism of the above character by means of which such operations may be accomplished at relatively high speeds of operation.

In applicant's co-pending applications Serial No. 318,-172, filed November 1, 1952, for "Method and Apparatus for Treating Tapes," and Serial No. 320,313, filed November 13, 1952, for "Method and Apparatus for Modifying Adhesive," there is described mechanism by means of which the layer of adhesive material upon a relatively wide band may be doctored or worked to redistribute the material away from the zones which are subsequently to become the margins of the strips of tape formed from the coated band of material. These prior structures utilize relatively stationary doctoring and/or cutting elements.

In accordance with this invention it is proposed to provide mechanism that may be moved to secure any degree of motion (including absence of relative motion) between the moving band of adhesively coated material and the doctoring and/or severing mechanisms, thus to enable high speeds of operation to be achieved.

In order that the means by which this result is achieved may be understood more fully, reference will now be made to the accompanying drawings, wherein Figure 1 is a view in end elevation, partly in section, showing an adhesive redistributing and band cutting mechanism constructed in accordance with the present invention;

Figure 2 is a partial view taken on the plane indicated by the line 2—2 of Figure 1, and looking in the direction of the arrows;

Figure 3 is a view in section taken on the broken line 3—3 of Figure 1, and looking in the direction of the arrows;

Figure 4 is a view in elevation looking from the left in Figure 1 (with the backup roll and band of material removed).

Figure 5 is a partial view in section taken on the line 5—5 of Figure 1 and looking in the direction of the arrows; and Figure 6 is a partial view in section (on an enlarged scale) taken on the line 6—6 of Figure 1 and looking in the direction of the arrows.

Referring to the above drawings, a backup roll or drum 10 is shown as having a band of material 11 passing over its surface, the outer side of the band having a layer of adhesive material 12 applied thereto. In order that the adhesive layer may be suitably redistributed to form relatively narrow longitudinal strips in which the adhesive is either removed or diminished in thickness, one or more redistributing rollers 13, 14, 15 and 16 are provided, these rollers being mounted upon a common shaft 17 that is journaled in a bracket 18 mounted upon a plate 18'. The plate 18' is mounted upon a transformer frame 19 which may, if desired, be mounted upon the frame upon which the backup roll 10 and related band guiding mechanism may be mounted, as described in applicant's co-pending application Serial No. 320,313, above mentioned. Suitable mechanism, not shown, may be provided to drive the shaft 17 at any desired speed thus to cause the periphery of the rollers 13–16 to move at the speed of the web or band 11 or at any differential speed with respect thereto.

Each roller 13–16 is formed with a spider or hub 20 having spaced arms 21 (four in number being shown in the drawings) upon opposite sides of which recesses 22 are formed. Diametrically spaced electrical terminals 23 are provided in each hub, each terminal having a male contact prong 24 extending outwardly therefrom and a female receptacle 25 thereon extending through the hub to receive the contact prong of an adjacent roller. In this fashion any multiple of rollers may be spaced upon the shaft 17 to provide for redistribution in any transverse pattern desired. Obviously, if wider strips of adhesive tape are to be formed, the axial thickness of the rollers 13–16 may be selected as desired.

The rim of each roller is formed of relatively high resistance material 26 with the edges thereof flanged inwardly as shown at 27 to provide a desired rigidity, and suitably spaced about the inner peripheries of the flanges 27 are spaced pairs of inwardly extending prongs 28 that are received within the recesses 22. In this fashion the rollers may be conveniently assembled, replaced and repaired, at the same time being effective units in the assembled position in order that the driving torque of the shaft 17 may be imparted to the rims 26. As shown in detail in Figure 5, the rims are formed with a circumferential bead 29 which engages, displaces and redistributes the adhesive layer in a desired manner as illustrated in Figure 6.

In order that an electric current may be supplied to the rotating rollers and rims above mentioned, electrical leads 30 are secured to spaced points on the inner periphery of the rims 26, each lead being formed with a curl 31 that engages over one of the terminal elements 23. The terminal elements of one of the end rollers (shown at the left in Figure 4) are provided with leads 32 that are connected to contact rings 33 which are supplied with an electric current by means of brushes 34 connected in a suitable electrical circuit. A suitable pressure is applied to the adhesive layer by springs 35 which bear upon and wipe against the peripheries of the rims 26 at points spaced diametrically from the points of contact of the rims with the adhesive layer, the springs being mounted upon the bracket 18 at 36 and the tension thereof adjusted by set screws 37, also mounted upon the bracket 18. The wiping ends of the springs are cut away at 38 to receive the beads 29 and thus serve to wipe the surface of the rims free of any adhesive that may have adhered thereto during the doctoring operation.

Following the doctoring operation above described, the band 11 is cut into strips 39 of adhesive tape by means of rotating cutters as shown in Figures 1, 3, and 4. To this end a plurality of rotating cutters is provided, one for each of the rollers 13–16. Each cutter is formed of a hub or spider 40 similar to the hub 20 of the rollers 13–16. Likewise arms 41 and recesses 42 correspond to the like elements of the first rollers, and terminals 43, prongs 44 and receptacles 45 correspond to the like elements 23, 24, and 25 previously described. Each cutter roller is provided with a peripheral ring 46 having an outer cutting edge 47 and a plurality of inwardly extending spring prongs 48 that is received within the recesses 42. Leads 49, corresponding to leads 30, connect the rings 46 with the terminals 43 and the cutter wheels or rollers are mounted upon and driven by a shaft 50 that is suitably driven as, for example, with shaft 17 in order that a desired speed relationship may be maintained between the cutting edges 47 and the band of material 11. Leads 51, contact rings 52 and brushes 53 are the counterparts of the corresponding elements 32, 33, and 34 previously described.

The shaft 50 is mounted upon a bracket 54 which may be mounted upon the bracket 18, and in order that a suitable pressure may be exerted upon the band of material 11 by the cutting edges 47, spring pressed backup rollers 55 are provided, these being mounted upon guide rods 56 carried by an arm 57 upon the bracket 54. The peripheries of the rollers 55 are grooved at 58 to receive the cutting edges of the rings 46.

As illustrated in Figure 4, the cutting edges 47 are preferably centered with respect to the beads 29 in order that the cuts may be symmetrical with respect to the bands or regions in which the adhesive has been removed or diminished in thickness by the doctoring rollers 13–16. Inasmuch as contact with the adhesive will remove some heat from the rims 26 and rings 46, the travel of these elements between contact with the adhesive and band of material will permit them to be reheated before further contact therewith, and they will always be hottest just prior to contact with the adhesive and band.

It will thus be seen that complete interchangeability of parts is provided as between the spiders of both the redistributing and cutting rollers, and that like conditions exist between the cutting rings. Moreover, the same applies to all redistributing rims of like width and manufacture and maintenance is thus facilitated as well as provision made for relatively high speeds of operation without damaging the band of material during such operation.

The particular form of cutting mechanism that is used with the rotatable doctor may, of course, be varied without affecting the operation of the doctor, and cutting mechanisms of the fixed blade, shearing or other conventional types may be substituted for the rotary cutter hereinabove specifically described. It will also be apparent that the slitting operation is facilitated by some relative movement between the cutting edge 47 and the web 11, although this is unnecessary for the redistributing mechanism inasmuch as there is merely the displacement of the film of adhesive material laterally of the band.

While the invention has been described with specific reference to the accompanying drawings, it is not to be limited save as defined in the appended claims.

I claim:

1. Mechanism for modifying the physical characteristics of adhesive coated bands, comprising a roller hub, means to journal the roller hub for rotary motion about a fixed axis, an annular electrically conductive element having a peripheral band engaging element thereon, means to mount the annular element on the hub with provision for movement relative thereto in a plane at right angles to said axis, means engaging the periphery of the annular element to urge the same yieldingly in a direction at right angles to said axis, and means to connect the annular element to a source of electric current.

2. A device, according to claim 1, wherein the peripheral band engaging annular element is of limited axial extent.

3. A device, according to claim 1, wherein the means to mount the annular element on the hub comprises radially extending inter-engaging elements.

4. A device, according to claim 1, wherein the roller is formed with a non-conducting hub, a plurality of arms on the hub, a recess in at least one side of each arm, and yieldable means on the annular element to engage the arms to secure the annular element removably to the hub.

5. A device, according to claim 1, wherein the roller is formed with a non-conducting hub, a plurality of arms on the hub, recesses in opposite sides of the arms, and yieldable prongs on the annular element to secure the latter to the arms.

6. A device, according to claim 1, wherein the annular element comprises a rim having cylindrical portions spaced by a peripheral bead.

7. A device, according to claim 1, wherein the annular element comprises a ring, the outer periphery of which is formed with a relatively sharp cutting edge.

8. A device, according to claim 1, wherein the means engaging the periphery of the annular element comprises a flat spring engaging the peripheral band engaging element whereby the element is cleaned during operation thereof.

9. A device, according to claim 1, wherein the pressure member comprises a spring pressed roller having a peripheral groove for engaging the peripheral band engaging element.

10. A device, according to claim 1, wherein the roller is formed with a non-conducting hub, means to secure the annular element removably to the hub, spaced terminals on the hub, means to connect the terminals to the annular element, and aligned contact elements on the terminals.

11. A device, according to claim 1, wherein the roller is formed with a non-conducting hub, means to secure the annular element removably to the hub, spaced terminals on the hub, means to connect the terminals to the annular element, and aligned prongs and receptacles on the terminals.

References Cited in the file of this patent

UNITED STATES PATENTS

| Number | Name | Date |
|---|---|---|
| 413,286 | Miller et al. | Oct. 22, 1889 |
| 1,014,424 | Troeger | Jan. 9, 1912 |
| 1,965,738 | Frostad | July 10, 1934 |
| 2,205,564 | Johnstone | June 25, 1940 |
| 2,293,178 | Stocker | Aug. 18, 1942 |
| 2,333,998 | Gordon | Nov. 9, 1943 |
| 2,360,653 | Davidson | Oct. 17, 1944 |
| 2,556,008 | Spalding | June 5, 1951 |
| 2,625,201 | Smith | Jan. 13, 1953 |